3,285,701
PROCESS AND APPARATUS FOR SEPARATING AND ANALYZING A FLUID MIXTURE
Thomas D. Robertson, Schererville, Ind., assignor, by mesne assignments, to Sinclair Research, Inc., New York, N.Y., a corporation of Delaware
Filed Jan. 18, 1963, Ser. No. 252,426
7 Claims. (Cl. 23—232)

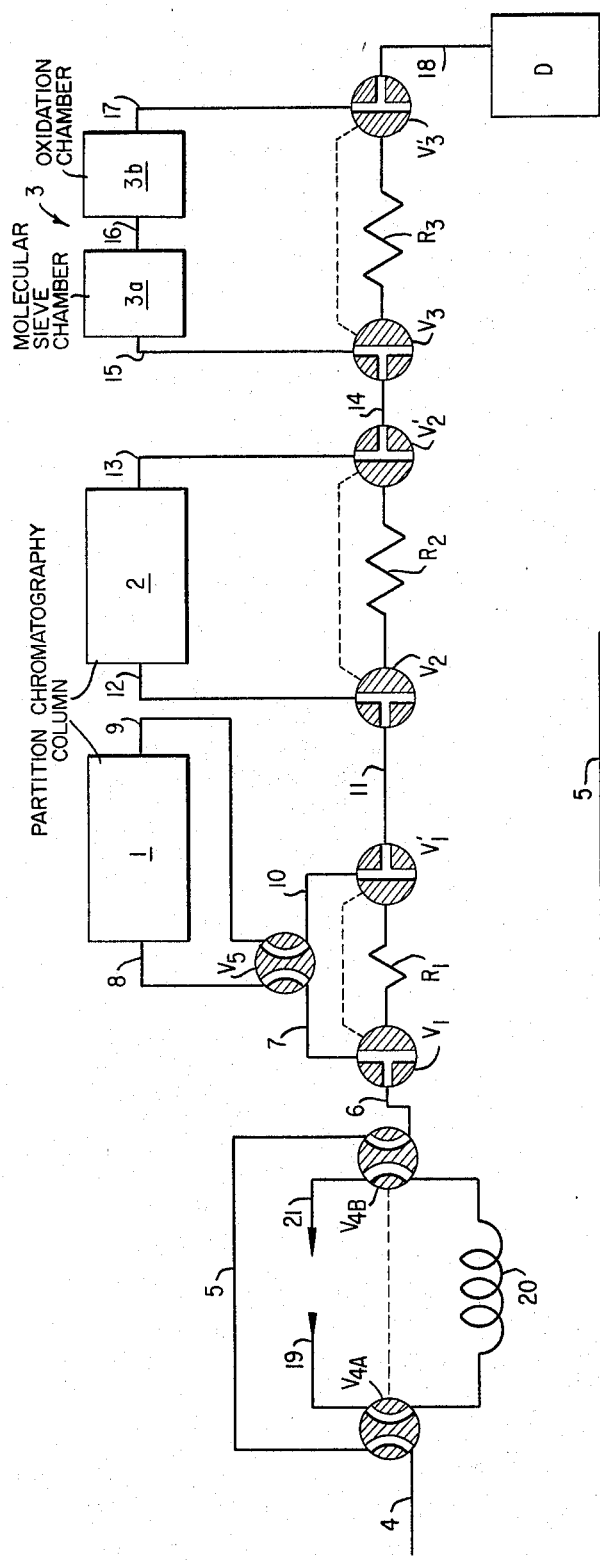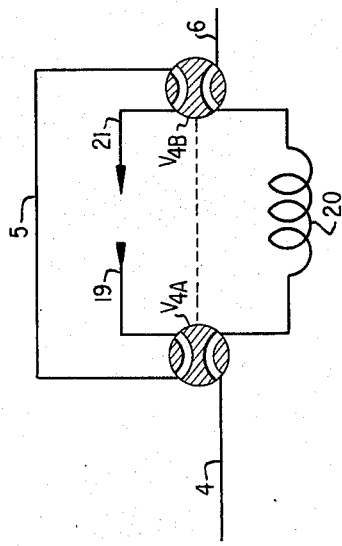

This invention relates to a method and apparatus for separating and analyzing fluid mixtures and more particularly to an improved method and apparatus for separating and analyzing a fluid mixture containing hydrogen and at least one or more of oxygen, nitrogen, carbon monoxide, carbon dioxide and $C_1$ through $C_6$ hydrocarbons. The apparatus of this invention includes a molecular sieve-oxidation column in combination with at least one partition chromatography column.

Conventionally a fluid mixture may be separated into its component parts via gas-liquid partition chromatography by injecting a small sample of the mixture in a carrier gas into the end of a long narrow column filled with inert granular solid particles on which has been deposited a thin film or coating of a high boiling organic liquid which is generally referred to as a stationary liquid phase. The separation is effected by the components of the mixture passing between the gas phase in the interstitial spaces of the column and the liquid phase formed by the high-boiling organic solvent coating on the granular solid particles. This causes the components of the mixture to move through the column with individual velocities which are less than that of the carrier gas. The velocity with which each component moves is dependent upon its partition coefficient, the latter being a measure of the solubility of the component in the stationary liquid phase. Since different compounds have different partition coefficients, the components of the mixture move through the column at different speeds and if the column is selective enough, they emerge one by one from the column, usually in the order of boiling points for a homologous series of compounds. The emerging components are identified by suitable means for detecting vapor concentration in a gas stream.

The prior art methods of partition chromatography have been valuable for many uses; however, in these methods there are present some disadvantages. For instance, while helium or hydrogen have generally been recommended as the carrier gas, difficulty has arisen where hydrogen is one of the components in the multicomponent fluid mixture to be separated. In such instances it is recommended that helium, instead, be used as the carrier gas. However while helium as a carrier gas provides a sensitivity of the system for hydrocarbons generally so that accurate detection is possible, it has been found that the system still does not exhibit a comparable sensitivity for hydrogen so that its accurate detection is accomplished with the same facility as the other components. Basically this sensitivity of components depends on a difference in the thermal conductivity of the carrier gas and the component being analyzed or detected. While it has been found that other components exhibit a relative thermal conductivity of about 5 to 6, hydrogen exhibits a relative thermal conductivity of about 35 which is about the same as that of helium.

It is an object therefore of the instant invention to provide a process and apparatus which permits ready and accurate analysis of a fluid mixture containing molecular hydrogen and at least one other molecular component such as oxygen, nitrogen, carbon monoxide, carbon dioxide, hydrogen sulfide and $C_1$ through $C_6$ hydrocarbons employing helium as a carrrier gas in a partition chromatography system. At the same time this invention also provides accurate analysis of lighter boiling hydrocarbons in a relatively short period of time without any substantial interference attributable to the presence of heavier components in the multi-component fluid mixture charged to the column.

The apparatus of this invention consists essentially of a zone comprised of two parts; the first part being a molecular sieve chamber in which the adsorptive separation of hydrogen, and one or more of oxygen, nitrogen, methane and carbon monoxide occurs; the second part being an oxidation chamber in which hydrogen is oxidized to water after hydrogen discharge from the molecular sieve chamber in order to obtain a sensitivity of the detection system for hydrogen comparable to that it displays with regard to the other components. This two-part zone is associated with at least one other partition chromatography column in series with the two-part zone. Both the two-part zone and the said other partition column are provided with by-pass means. The said other partition column separates from the carrier gas stream a hydrocarbon and/or carbon dioxide prior to passage to the two-part zone.

A line is provided for introducing a sample gas mixture into the system and this line can be valve-controlled for directing the sample to a vent line when a fixed-volume sample loop associated with the system is filled. A line is also provided for introducing carrier gas into the system and this line is valve-controlled for directing the flow of gas to by-pass the sample loop or to sweep the sample gas mixture from the fixed-volume sample loop into the chromatography system. The said other partition column is provided with means for admitting carrier gas and/or the fixed-volume of sample gas swept by the carrier gas. The said other partition column is also provided with means for delivering the effluent from said column to the two-part zone or first to one additional or a plurality of partition columns, if desired, which may be interposed between it and the two-part column of this invention. When more than one partition column is provided, each additional column is also in series with the first partition column and the two-part molecular sieve-oxidation zone. Also each additional partition column is provided with by-pass means, means for admitting the effluent from the immediately preceding partition column and means for delivering its effluent to the next succeeding partition column or to the two-part zone of this invention in the instance when the added partition column immediately precedes such two-part zone. Valve means are associated with the two-part zone and all columns and associated by-pass means and are operable so that at the appearance of predetermined substances in the effluent from any column or the two-part zone, the flow of carrier gas through the column or the two-part zone may be diverted through the by-pass means. Such arrangement permits the retention of predetermined substances in a particular area and for the selective determination of the retained substances in each column in a quick and easy method. Valve means are also associated with the first partition column to reverse the flow of carrier gas through the column at the appearance of certain predetermined substances. This arrangement permits a quick expulsion of relatively heavy hydrocarbons from the system through subsequent by-pass means, thus obviating the passage of these substances through areas not designed to effect their partition.

The first and any additional partition columns employed can be provided with a packing material comprising a partitioning liquid disposed on a relatively inert solid carrier such as diatomaceous earth, ceramic beads or ceramic disks. Preferably the inert support is a material sold commercially under the trade name Chromosorp P which is crushed firebrick having a mesh size in the range of about 30 to 60 mesh. Preferably this support is treated with a small amount of a reactive silicone such as water-soluble siliclad or dichloro-dimethyl silane, hexamethyldisilizane, etc. which effectively reduces "tailing" in the analysis. "Tailing" in this connotation refers to nonsymmetrical peaks in curves representing chromatographically separated sample-gas mixture components. For example, a lagging tail appears as an extended, i.e., more gradual slope on the trailing edge of a peak and is an indication of a delay in departure, i.e., desorption, of the last portion of a sample gas-mixture component from the separation column. Such tailing often results in poor separation due to overlapping between adjacent component curves so that an individual curve measurement may not be fully representative of the related component concentration. The treated support is then coated with a high-boiling partitioning liquid; presently in use are mineral oil, dioctyl phthalate, di-nonyl phthalate, silicones, tri-cresyl phosphate, dibutyl phthalate, di-n-butyl maleate and the like. The liquid is generally present in amounts of about 2 to 50 weight percent, preferably about 20 to 40 weight percent of the support material.

The first part of the two-part zone is a molecular sieve chamber which may be packed with any of the well-known high area calcium, sodium or magnesium alumino silicates which are suitable for sieving action. Other alkali metal or alkaline earth alumino silicates may also be employed. The pores in different alumino-silicates may vary in diameter from about 3 or 4 to 15 or more Angstrom units, but for any one silicate the pores are substantially of uniform size. It is preferred to use alumino-silicates having pore openings of about 9–15 A., sufficient to admit freely individual molecules of hydrogen, oxygen, nitrogen, methane and carbon monoxide. One such suitable material is commercially available and is sold under the trademark Linde Type 13X Molecular Sieve. The second part of the two-part zone is an oxidation chamber which may be packed with any suitable solid oxidant such as copper oxide and which is maintained under conditions such that hydrogen only is oxidized.

The method of this invention, employing the above described two-part zone in association with one or more partition columns, all in series, comprises injecting a carrier gas-sample gas-mixture into the system of columns and passing the mixture to one or more of the columns via a network of associated conduits and valves according to a predetermined time sequence. The method and apparatus of this invention as well as the determination of the time sequence scheme of valve position changes will be described in more detail by referring to the drawings which show diagrammatically a preferred embodiment of the apparatus used for analyzing fluid mixtures.

FIGURE 1 is a schematic diagram showing the apparatus in standby position with the carrier gas, helium, flowing through the columns.

FIGURE 2 is a schematic diagram showing the apparatus in the charge position with the carrier gas sweeping the sample-gas mixture into the system.

Referring now to FIGURE 1, the apparatus of the drawing comprises a first partition column 1, a second partition column 2 in series with column 1 and a two-part zone 3, the first part, 3a, a molecular sieve chamber containing molecular sieve material and the second part, 3b, an oxidation chamber, containing a solid oxidant. Zone 3 is in flow series with both columns 1 and 2 and all three are provided with by-pass means comprising multi-port by-pass valves $V_1$, $V_1'$, $V_2$, $V_2'$, $V_3$ and $V_3'$, respectively. Corresponding by-pass flow restrictors $R_1$, $R_2$ and $R_3$ are calibrated to have the same flow resistance as columns 1 and 2 and zone 3, respectively. In the stand-by position, as shown, carrier gas is introduced to the system through line 4, passing through a port of sampling valve, $V_{4A}$, to the sample loop by-pass line 5, thence through a port of sampling valve, $V_{4B}$, where it enters conduit 6 leading to the columns and/or their associated by-pass means. In this stand-by position, the by-pass valves $V_1$, $V_1'$, $V_2$, $V_2'$, $V_3$ and $V_3'$, are positioned to admit the carrier gas leaving conduit 6 to the columns and two-part zone, thus by-passing the alternative flow restrictor routes $R_1$, $R_2$ and $R_3$. The carrier gas is delivered to the detector D via the following route: out conduit 6 through a port of by-pass valve $V_1$ leading to line 7, thence through back-flush valve $V_5$ in communication with line 8 which leads to the inlet end of column 1. The carrier gas passes through column 1 and is conducted via line 9 associated with the outlet end of said column back through another port of back-flush valve $V_5$ which is in communication with line 10. The gas emerging from line 10 passes to line 11 through a port in by-pass valve $V_1'$ and thence to column 2 through a port in by-pass valve $V_2$ which is in communication with line 12 leading to the inlet end of column 2. The carrier gas passes through column 2 and is conducted via line 13 associated with the outlet of said column back through a port of by-pass valve $V_2'$ which is in communication with line 14. The gas emerging from line 14 is passed to zone 3 through a port in by-pass valve $V_3$ in communication with line 15 leading to the inlet end of chamber 3a, a molecular sieve chamber. The carrier gas leaves the molecular sieve chamber through line 16, is introduced to chamber 3b, an oxidation chamber, and passes out of 3b via line 17 to the detector D through a port in by-pass valve $V_3'$ and line 18 leading to the detector. This flow scheme is designated as the normal flow pattern.

With the normal flow pattern of the carrier gas thus established, the carrier gas pressure is adjusted to obtain a steady flow rate through the system. For purposes of calibrating the by-pass flow restrictors, a flow rate of 80 milliliters per minute measured at the detector exit through the system may be chosen. After steady flow of the carrier gas at the desired flow rate is established, by-pass valves $V_3$ and $V_3'$ are repositioned so that their ports communicate with $R_3$ rather than column inlet line 15 or column outlet line 17 to permit carrier gas to flow through the restrictor. $R_3$ is then adjusted to obtain a fluid flow rate of 80 milliliters per minute through the system, as measured at the detector exit. Subsequently $R_2$ is similarly calibrated to give the desired flow rate. To accomplish the calibration of $R_2$ by-pass valves $V_3$ and $V_3'$ remain adjusted for bypass flow, i.e. through $R_3$, while by-pass valves $V_2$ and $V_2'$ are repositioned so that their ports communicate with $R_2$ rather than column 2 inlet line 12 and outlet line 13. After calibration of $R_2$, by-pass valves $V_2$ and $V'_2$ remain adjusted for bypass flow, i.e. through $R_2$ and by-pass valves $V_1$ and $V_1'$ are repositioned to admit carrier gas through $R_1$ rather than through line 7, back-flush valve $V_5$, column inlet line 8, column outlet line 9 and line 10. $R_1$ is then adjusted to obtain a fluid flow rate of 80 milliliters per minute through the system, after which valves $V_1$ and $V_1'$, $V_2$ and $V_2'$, and $V_3$ and $V_3'$ can be reset for normal flow of gas through column 1, column 2 and two-part zone 3. With the steady flow of carrier gas through the system, a sample gas-mixture is admitted through line 19 and passes through another port of sampling valve $V_{4A}$ to fixed volume sample loop 20. Excess sample-gas mixture is vented through another port of valve $V_{4B}$ and out line 21.

Referring now to FIGURE 2, the sample gas trapped in sample loop 20 may be admitted to the system by adjusting valve $V_{4A, B}$ so that the carrier gas which heretofore passed through line 5 is now admitted to sample loop 20 to sweep its contents out through line 6 and thence in accordance with the established normal flow pattern described above. At the same time sample gas-mixture entering the system through line 19 is vented via sample loop by-pass line 5 out line 21.

The system having been calibrated for a uniform flow rate through the columns and by-pass means as described above, a time sequence of valve changes may now be established. Such may be accomplished by procedures recognized by those skilled in the art and it will depend for instance on the number of components of the sample gas mixture desired to be analyzed and in turn on the number of partition columns employed. For purposes of illustration, two partition columns, as shown, have been chosen, and a fluid mixture containing hydrogen, oxygen, nitrogen, carbon monoxide, carbon dioxide and $C_1$ through $C_6$ hydrocarbon has been selected. The purpose of establishing a time sequence of valve position changes is to retain in column 1 the $C_3$–$C_6$ hydrocarbons, to retain in column 2, $CO_2$ and $C_2$ hydrocarbons and to permit all other lighter components and $C_1$ hydrocarbons to pass to two-part zone 3. The order of release from the columns involved is that in which these components have been listed above.

While many different methods will be apparent to those skilled in the art for determining the proper times at which column by-pass valve means are actuated so as to trap the desired components in their respective columns, one such apparent method is as follows. With the system calibrated as above and with a steady flow of carrier gas passing through the system a pure sample of $CO_2$ is admitted to line 19 and it is passed to sample loop 20. Excess is vented through line 21. Valves $V_{4A, B}$ are then adjusted to permit carrier gas to flow through sample loop 20 and sweep the $CO_2$ sample into column 1 through line 6, valve $V_1$, line 7, backflush valve $V_5$ and line 8. Valves $V_1'$, $V_2$, $V_2'$, $V_3$ and $V_3'$ have been positioned so that the flow passage is through column by-pass flow restrictors $R_2$ and $R_3$ to the detector system D. The time it requires for the complete detector of $CO_2$ as measured at D is noted and designated as time $T_1$ which is equal to the time at which, when analyzing a sample gas-mixture, valves $V_1$ and $V_1'$ are to be manipulated to by-pass column 1 and thus retain components heavier than $CO_2$, i.e. the $C_3$–$C_6$ or heavier hydrocarbons of the sample gas mixture.

A methane sample gas is next admitted to the system in much the same fashion as the $CO_2$ sample was admitted. However, valves $V_3$ and $V_3'$ are positioned so that the flow passage will be through by-pass flow restrictor $R_3$ while valves $V_1$, $V_1'$, $V_2$ and $V_2'$ are adjusted so that the $C_1$ sample and carrier gas will pass through column 1 and column 2. The time it requires for the complete detection of the $C_1$ sample, measured at D, is noted and designated as time $T_2$ which is equal to the time at which, when analyzing a sample gas mixture, valves $V_2$ and $V_2'$ are to be re-positioned from a normal flow pattern to by-pass column 2 and thus retain components $CO_2$ and $C_2$ hydrocarbons therein. Thus according to this scheme when a sample gas-mixture is admitted to the system for analysis and with the system arranged for normal flow therethrough to the detector D, i.e. by-pass valves are positioned for flow through the columns rather than through the column by-pass flow restrictors; at the end of time $T_1$, column 1 is by-passed and $C_3$ and heavier hydrocarbons are retained therein; at the end of time $T_2$, column 2 is by-passed and $CO_2$ and the $C_2$ hydrocarbons are retained therein with the remaining lighter components passing through zone 3 and being analyzed and recorded in detector system D. These latter components, which are the first to be analyzed in the order in which they may appear, are hydrogen in the form of water (having passed through oxidizing chamber 3b after release from molecular sieve chamber 3a), oxygen, nitrogen, carbon monoxide and the $C_1$ hydrocarbon components.

After detection and recordation of the $C_1$ components valves $V_3$ and $V_3'$ are repositioned to establish a carrier gas (i.e. helium) flow pattern through by-pass flow restrictor $R_3$ and by-pass valves $V_2$ and $V_2'$ are adjusted for normal flow of carrier gas through column 2. Valves $V_1$ and $V_1'$ are maintained for flow through restrictor $R_1$. The flow of carrier gas to column 2 is continued until the $C_2$ and $CO_2$ components are detected and recorded.

After complete removal of $CO_2$ from column 2, valves $V_2$ and $V_2'$ are adjusted to establish a flow pattern through by-pass flow restrictor $R_2$. Valves $V_3$ and $V_3'$ are maintained for flow through restrictor $R_3$ and valves $V_1$ and $V_1'$ are set for flow through column 1. The flow of carrier gas to column 1 is continued until the $C_3$–$C_5$ components are detected and recorded. If $C_6$ and heavier components were originally present in the sample gas-mixture, and if their analysis is not required they may be conveniently removed from the system and recorded as a broad unresolved peak by reversing the flow of carrier gas through column 1. In order to remove these heavier components from the system in a relatively short period of time, back-flush valve $V_5$ is adjusted as through a conventional cross-over conduit (not shown), so that it communicates line 7 with line 9 and thus the flow of carrier gas enters the normal outlet conduit of column 1. Since the heavier hydrocarbons will be concentrated near the inlet of column 1, only a relatively short time is required for their release from this unit. The emerging heavier hydrocarbons are thus passed out line 8 back through a cross-over port of back-flush valve $V_5$ to line 10 and through valve $V_1'$ to the detector D; valves $V_2$, $V_2'$, $V_3$ and $V_3'$ being positioned for flow through restrictors $R_2$ and $R_3$.

The particular column lengths and diameters are advantageously such that the length of the second column has a greater capacity than both the first and third columns while all columns, preferably, have the same diameter. Columns 1 and 2 are operated at ambient temperatures, usually, as well as part 1, that is the molecular sieve chamber, of column 3. The oxidation chamber, i.e. the second part of column 3 is maintained, generally, at an elevated temperature, e.g. of about 400 to 420° C.

I claim:

1. Apparatus for separating and analyzing a fluid mixture having a plurality of constituents which comprises separation means consisting essentially of a molecular sieve chamber and an oxidation chamber in series for fluid flow, said means being in series for fluid flow with at least one partition chromatography column, means to introduce a carrier gas into said column and said separation means, means to introduce in said carrier gas a fluid mixture to be separated and analyzed in said column and said separation means, flow by-pass means associated with each of said column and said separation means to by-pass flow therethrough, means provided to switch flow of said carrier gas from said column to its respective said by-pass means on the release of predetermined constituents of said fluid mixture in the effluent of said column to retain therein remaining constituents of said fluid mixture, said molecular sieve chamber providing means for selectively retarding the passage of a predetermined constituent, said oxidation chamber providing means for the oxidation of hydrogen and means for analyzing the effluent from said separation means and the subsequently released components retained in said column.

2. The apparatus of claim 1 containing a plurality of partition columns in series for fluid flow and each being equipped with said flow by-pass means.

3. Apparatus for separating and analyzing a fluid mixture having a plurality of constituents which comprises separation means consisting essentially of a molecular sieve chamber and an oxidation chamber in series for fluid flow, said means being in series for fluid flow with at least one partition chromatography column, means to introduce a carrier gas into said column and said separation means, means to introduce in said carrier gas a fluid mixture to be separated and analyzed in said column and said separation means, means associated with each of said column and said separation means to by-pass flow therethrough, said means comprising by-pass valve means and a by-pass flow restrictor, said restrictor providing substantially the same resistance to flow therethrough as its respective said column and said separation means, said by-pass means provided to direct flow of said carrier gas from said column to its said by-pass means on the release of a predetermined constituent of said fluid mixture in the effluent from said column to retain therein remaining constituents of said fluid mixture, said molecular sieve chamber providing means for selectively retarding the passage of a predetermined constituent, said oxidation chamber providing means for the oxidation of hydrogen and means for analyzing the effluent from said separation means and the subsequently released constituents retained in said column.

4. The apparatus of claim 3 containing a plurality of partition columns in series for fluid flow and each being equipped with said flow by-pass means.

5. A method for analyzing and separating into a plurality of constituents a fluid mixture consisting essentially of a first component containing hydrogen and at least one of a member selected from the group consisting of oxygen, nitrogen, carbon monoxide and methane with at least one other component selected from the group consisting of a first member and a second member, said first member selected from the group consisting of carbon dioxide and hydrocarbons having two carbon atoms, said second member being a hydrocarbon containing from 3 to 5 carbon atoms, which comprises passing a helium carrier gas charged with said fluid mixture through a plurality of zones consisting essentially of a first zone comprised of at least one partition chromatographic column which selectively retards passage of said other component of said fluid mixture passed thereto in said carrier gas, discontinuing passage of said carrier gas charged with said fluid mixture to said partition column on the release of a predetermined constituent of said first component to retain in said column said other component, passing said carrier gas charged with said first component to a second zone consisting essentially of a molecular sieve and an oxidizing region, selectively absorbing said first component in said molecular sieve, oxidizing hydrogen effluent from said molecular sieve in said oxidizing region, analyzing said first component, discontinuing passage of said carrier gas to said second zone, resuming flow of said carrier gas to said first zone and analyzing said other component released therefrom.

6. A method for analyzing and separating into a plurality of constituents a fluid mixture consisting essentially of a first component containing hydrogen and at least one of a member selected from the group consisting of oxygen, nitrogen, carbon monoxide and methane with other components selected from the group consisting of a first member and a second member, said first member selected from the group consisting of carbon dioxide and hydrocarbons having two carbon atoms, said second member being a hydrocarbon containing greater than 3 carbon atoms, which comprises passing a helium carrier gas charged with said fluid mixture to a first zone comprising a first partition column, continuing passage of said carrier gas through said first column for a time sufficient to selectively retain therein predetermined constituents of said fluid mixture comprising said second member of said other component, selectively releasing other constituents in said carrier gas from said first column, passing remaining constituents of said fluid mixture to a second zone comprising a second partition column while discontinuing passage of said carrier gas to said first column, continuing passage of said carrier gas charged with said other constituents to said second partition column for a period of time sufficient to selectively retain therein predetermined constituents of said fluid mixture comprising said first member of said other components, selectively releasing remaining constituents in said carrier gas from said second column, passing said remaining constituents comprising said first component in said carrier gas to the first part of a two-part third zone, said first part comprising a molecular sieve, said second part comprising an oxidizing region, to selectively absorb therein said first component while discontinuing passage of said carrier gas to said second column, continuing passage of said carrier gas charged with said remaining constituents to said first part of said third zone to selectively release said first component from said first part of said third zone, oxidizing the released molecular hydrogen in said second part of said third zone, analyzing said first component, discontinuing passage of said carrier gas to said third zone, resuming flow of said carrier gas through said second zone for a period of time sufficient to withdraw and analyze constituents retained therein, discontinuing flow of carrier gas through said second zone and resuming flow of said carrier gas through said first zone for a period of time sufficient to withdraw and analyze constituents retained therein.

7. The method of claim 6 which includes passing the carrier gas to the outlet of said first zone to flush said zone of hydrocarbons having a carbon content of more than five carbon atoms while discontinuing passage of said carrier gas through said second and third zones.

References Cited by the Examiner

UNITED STATES PATENTS

| 3,006,836 | 10/1961 | Cole | 23—232 |
| 3,030,798 | 4/1962 | Lichtenfels | 73—23 |
| 3,096,157 | 4/1963 | Brown et al. | 23—254 |

MORRIS O. WOLK, *Primary Examiner.*

Z. PAROCZAY, *Assistant Examiner.*